Dec. 7, 1965     S. R. ROSENTHAL     3,221,739
INJECTION DEVICE
Filed March 26, 1962     2 Sheets-Sheet 1
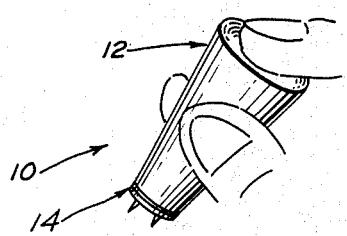
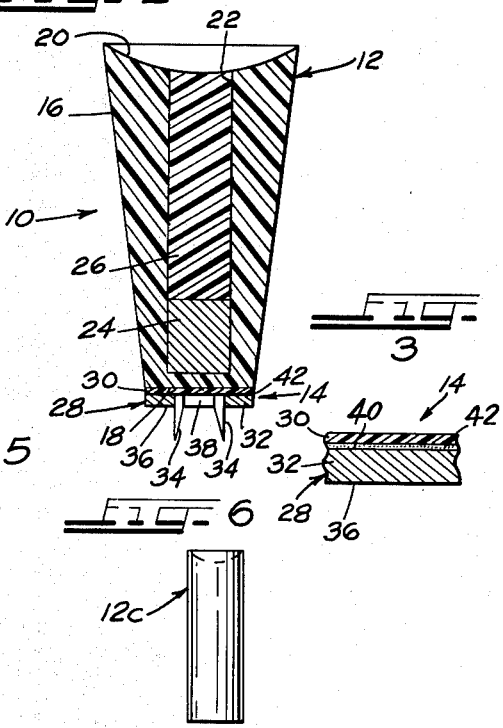
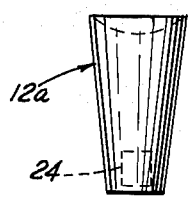
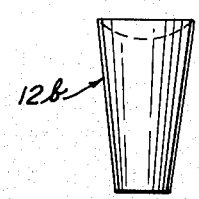
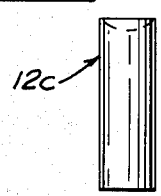
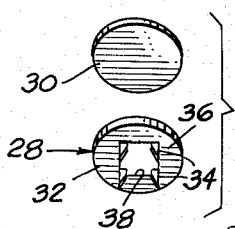
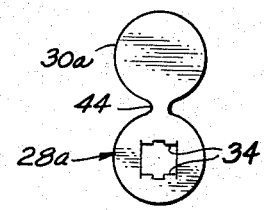
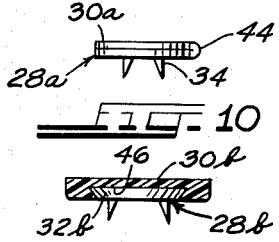
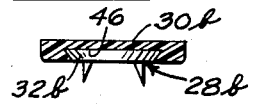
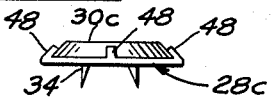
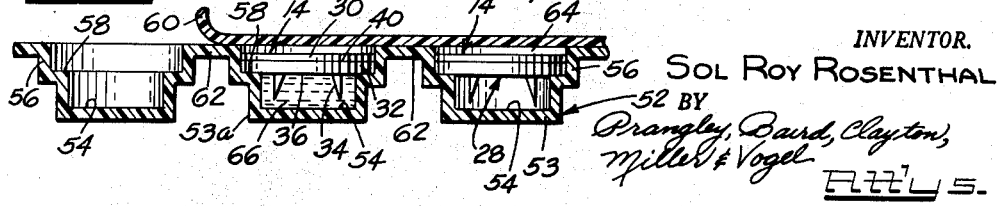
INVENTOR.
SOL ROY ROSENTHAL
BY
Prangley, Baird, Clayton,
Miller & Vogel
Att'ys.

Dec. 7, 1965   S. R. ROSENTHAL   3,221,739
INJECTION DEVICE
Filed March 26, 1962   2 Sheets-Sheet 2
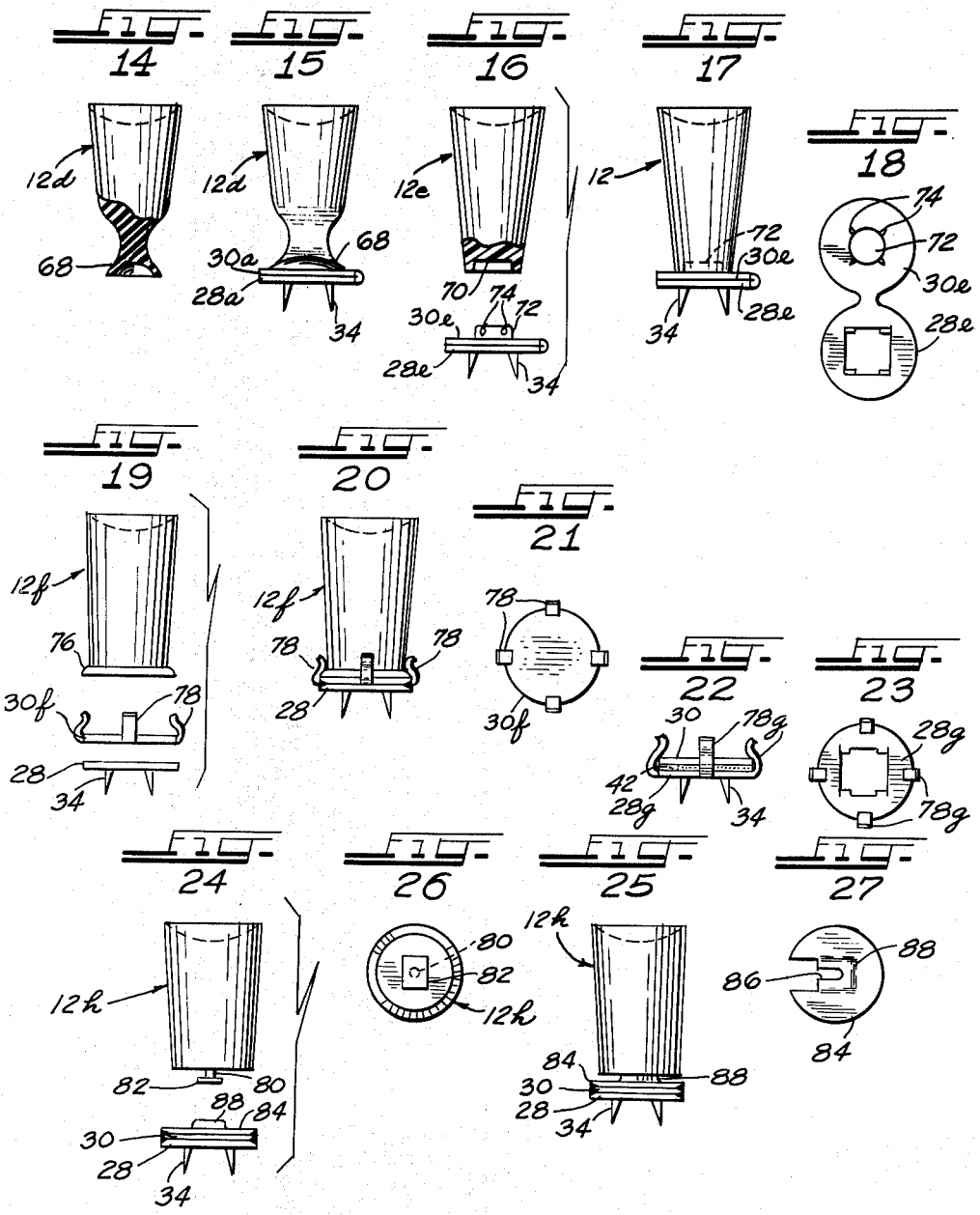
INVENTOR.
SOL ROY ROSENTHAL
BY

United States Patent Office 3,221,739
Patented Dec. 7, 1965

3,221,739
INJECTION DEVICE
Sol Roy Rosenthal, 230 E. Delaware Place, Chicago, Ill.
Filed Mar. 26, 1962, Ser. No. 182,220
7 Claims. (Cl. 128—253)

This invention relates to a new and improved injection device for skin testing, vaccination, inoculation, and the like.

As disclosed in my prior U.S. Patent No. 2,619,962, I have heretofore provided an injection device by which skin tests, vaccinations, or inoculations are made by employing a multiple puncture technique. A biological test substance, a vaccine, or the like is introduced into the skin transcutaneously by multiple punctures of identical character and depth distributed over an area of the skin. The device disclosed in the patent includes a thin metal plate or disc having needle-like projections punched therefrom and extending in parallel relationship from one side thereof, outwardly beyond the level of the adjacent surfaces of the plate. The plate, as shown in the patent, is provided with a pair of arms extending from opposite sides thereof which may serve as handles or finger pressure points during the use of the device. After cleansing the skin and applying a quantity of test substance or vaccine thereto, the device is placed against the skin and pressed inwardly, thereby forming a plurality of skin punctures with a resulting injection of the substance at the site of each puncture, without scarification of the skin.

In my copending patent application, Serial No. 787,086, filed January 15, 1959, now Patent No. 3,072,122, issued January 8, 1963, I have disclosed and claimed an improved injection device which includes inter alia a rigid backing member of moldable plastic material or the like adapted to be held in the fingers, a thin plate secured to the backing member, and a plurality of needle-like projections on the plate and projecting from one side thereof. Very advantageously, a prepared package is provided, wherein a dried biological substance is present on the needle-like projections for transcutaneous introduction into the body, and a substantially rigid, imperforate protective cover is removably secured to the backing member and covers the plate for protecting the needle-like projections and the biological substance thereon from contamination prior to use.

In my copending patent application, Serial No. 166,582, filed January 16, 1962, I have disclosed and claimed further improvements on my aforesaid injection devices. In particular, a transcutaneous injection device is provided which includes a skin perforating member having a plurality of needle-like projections extending from one side thereof outwardly beyond the level of the outermost adjacent surface on the device. A knob is secured to the perforating member and extends from the opposite side thereof. The knob is adapted to be held with one hand to press the perforating member against the skin, whereupon the needle-like projections puncture the skin at a plurality of points for the purpose of introducing biological substances into the body. The injection device can be grasped at any aspect of its perimeter, and then applied quickly and accurately and with improved visbility during the injection. The ease and rapidity of injection which is afforded enables the physician to vaccinate or treat large groups of patients within relatively short periods of time.

The foregoing injection devices have proven to be admirably suited for the intended purposes. The latter injection device, which includes a knob or thimble secured to a skin perforating member, is becoming increasingly popular owing to the additional advantages thereof. However, despite its relative simplicity and economy, enabling disposal of the device after it has been used once, there are important applications or potential applications of the device where it is necessary or desirable to reduce the cost still further.

Accordingly, an important object of the present invention is to provide a very low cost injection device for use where cost is a factor, such as in mass testing of patients or in multiple tests conducted on individuals.

An accompanying important object is to provide an injection device which maintains the necessary sanitary conditons and which preserves the purity of biological substances being injected.

More particularly, an object of the invention is to provide a device which is safeguarded against the transfer of body fluids from one person to another, thereby preventing the transmission of, e.g., infectious hepatitis. Similarly, when successive tests are made with a series of different biological substances, the substances are not intermixed and the purity thereof is preserved for each injection.

A specific object of the invention is to provide an injection device including a holder or backing member and a skin perforating member which are separable, whereby the holder may be re-used while the skin perforating member is discarded.

An additional object is to provide a skin perforating member package which is adapted for cooperation with an injection device holder. More particularly, a holder is attachable to a skin perforating member in the package, and the perforating member is removable with the holder to provide an injection device ready for use, with no other handling. Preferably, the skin perforating members are removed one at a time, as used.

These and other objects, advantages and functions of the invention will be apparent on reference to the specification and to the attached drawings illustrating preferred embodiments of the invention, in which like parts are identified by like reference symbols in each of the views, and in which;

FIG. 1 is a perspective view of one embodiment of the new injection device, illustrating a preferred manner of grasping it by the fingers of one hand for making an injection;

FIG. 2 is an enlarged vertical cross-sectional view of the embodiment of FIG. 1;

FIG. 3 is a further enlarged fragmentary vertical sectional view of the embodiment, illustrating one manner of attachment of the parts of a skin perforating assembly in the device;

FIGS. 4–6 are side elevational views of three other embodiments of the holder or backing member of the new injection device;

FIG. 7 is a bottom perspective and exploded view of the parts of one embodiment of the skin perforating assembly, such as employed in FIGS. 1–3;

FIG. 8 is a top plan view of the parts of another embodiment of the skin perforating assembly, prior to assembling them in their positions as used;

FIG. 9 is a side elevational view of the skin perforating assembly of FIG. 8 with the parts assembled as used;

FIG. 10 is a cross-sectional and elevational view of another embodiment of the skin perforating assembly;

FIG. 11 is a side elevational view of a further embodiment of the skin perforating assembly;

FIG. 12 is a top plan view of a skin perforating member package adapted for cooperation with an injection device holder such as illustrated in FIGS. 1, 2 and 4–6;

FIG. 13 is an enlarged cross-sectional and elevational view thereof taken on line 13—13 of FIG. 12;

FIG. 14 is a side elevational view, partly broken away and in section, of another embodiment of the injection device holder;

FIG. 15 is a side elevational view of another embodiment of the injection device, which includes the holder of FIG. 14 and the perforating assembly of FIGS. 8 and 9;

FIG. 16 is an exploded elevational view, partly broken away and in section, of a further embodiment of the injection device;

FIG. 17 is an elevational view thereof with the parts assembled;

FIG. 18 is a plan view of the skin perforating assembly thereof, which is similar to that of FIG. 8;

FIGS. 19 and 20 are exploded and assembled elevational views, respectively, of an additional embodiment of the injection device;

FIG. 21 is a top plan view of a cover in the skin perforating assembly thereof;

FIG. 22 is a side elevational view of another skin perforating assembly which may be substituted for that in FIGS. 19 and 20;

FIG. 23 is a top plan view of the skin perforating member thereof;

FIGS. 24 and 25 are exploded and assembled views, respectively, of a further embodiment of the injection device;

FIG. 26 is a bottom plan view of the holder thereof;

FIG. 27 is a top plan view of a fastener for the skin perforating assembly thereof.

The new injection device comprises a holder, a skin perforating member including a plurality of needle-like projections extending from one side thereof, and means for quickly and easily detachably securing the perforating member on the holder with the side of the member opposite to the side having the projections facing the holder. An injection may be made by grasping the holder and pressing the projections against the skin, and thereafter the perforating member may be quickly removed from the holder and replaced by another like perforating member.

Referring to the drawings, one embodiment of the new injection device is a transcutaneous injection device generally indicated by the number 10 in FIG. 1 and 2. The device includes a magnetic holder or backing member 12 and a skin perforating assembly 14 magnetically held or attached thereon. The holder includes an outwardly widening frusto-conical knob or thimble 16 having a flat circular inner end 18 and an outer concave end 20. An axial bore 22 extends inwardly from the concave end 20 and terminates in the knob 16 adjacent to the inner end 18. A permanent magnet 24 is disposed at the inner end of the bore, and it is held in position by a plug 26 which fills the remainder of the bore. In this preferred embodiment, the knob 16 and the plug 26 are constructed of molded thermoplastic resinous material, for example, polystyrene, polyethylene, nylon, or Teflon. If desired, the parts may be constructed of other non-magnetic materials.

The skin perforating assembly 14 is shown more clearly in FIGS. 2, 3 and 7. It includes a skin perforating member 28 and a cover or shield 30 attached thereto. The perforating member includes a magnetizable or paramagnetic base 32 and four needle-like projections or needles 34 extending outwardly from one side 36 of the base substantially at right angles thereto. The base 32 of the perforating member preferably is a very thin circular flat metal disc or plate, and the projections 34 are punched or struck out therefrom. Each projection is triangular in configuration with a relatively small base, and each terminates at its free end in a sharp point. As seen more clearly in FIG. 7, the resulting skin perforating member 28 is a one-piece construction including the circular disc 32 having a central square opening 38, and the projections 34 arranged at the corners of the opening. The projections are adapted simultaneously to puncture and penetrate the skin up to the disc at four points and to inject a substance into the body.

The cover 30 of the skin perforating assembly is an imperforate circular flat disc, and it is attached to the inner side 40 of the perforating member disc 32, in register or mating therewith. The cover provides a barrier or shield interposed between the perforating member 28 and the holder 12, to prevent blood or other body fluids from reaching the holder. In like manner, the cover prevents testing substances on the perforating member 28 from reaching the holder. When the holder is used repeatedly with a succession of perforating members 28, as subsequently described, this construction safeguards against the transmission of body fluids from one patient to another, preventing transfer of infectious hepatitis, for example. When the perforating members are employed with different test substances, the construction also prevents the substances from adhering to the holder and possibly interfering with subsequent tests employing different substances.

The cover 30 is constructed of a suitable impervious material such as plastic, metal, impervious paper or other sheet or film material. In a preferred embodiment, the cover is formed from thin plastic sheet material or film, such as Saran. The plastic cover very advantageously is attached to the inner side 40 of the perforating member disc 32 by the surface tension of an innocuous or physiologically inert fluid film 42. A preferred fluid for the purpose is glycerine. Alternatively, a layer or film of adhesive for joining plastic to metal may be employed in place of the fluid film. In a further alternative, the cover 30 may be bonded directly to the metal disc by heating a thermoplastic cover to soften it and cause it to adhere to the metal disc.

As an example of the dimensions for the skin perforating assembly 14, the perforating member disc 32 may be about 0.2 mm. in thickness, and the projections 34 have the same thickness. The cover disc 30 may be a very thin film of about one-fourth the thickness of the perforating member disc. The projections 34 lie substantially on the circumference of a circle of lesser diameter than the perforating member disc 32, and they are substantially uniformly spaced therearound. The diameter of the perforating disc preferably is a minimum of about 8 to 10 mm. when a four-needle device is employed. For use in tuberculin testing, the diameter preferably does not exceed 10 mm. The projections 34 are spaced preferably from 4 to 10 mm. apart, and they are preferably disposed about 1.5 to 3.5 mm. inwardly from the periphery of the perforating member disc 32. In tuberculin testing, for example, the width of the margin between the projections 34 and the periphery of the perforating member disc is about 1.5 to 2.5 mm. The projections 34 extend from the outer side 36 of the perforating member disc 32 for a distance of about 2 to 2.5 mm.

FIGS. 4–6 illustrate three other embodiments of magnetic holders 12a, 12b and 12c. The holder 12a is constructed as a solid block of plastic with the magnet 24 encased therein during the molding operation. The holders 12b and 12c are constructed entirely as permanent magnets. The holder 12c is constructed as a cylinder, instead of the frusto-conical shape of the holders in the preceding views. The cylindrical holder is employed in the same manner.

FIGS. 8–11 illustrate other embodiments of the skin perforating assembly. In the assembly of FIG. 8, a circular metal cover 30a is integral with a perforating member 28a, being joined thereto by a narrow hinge strap 44. The cover is folded over the perforating member and employed as shown in FIG. 9. In place of the integral cover 30a, a separate metal disc cover may be employed and suitably attached to the perforating member 28a, such as by welding or soldering.

In the skin perforating assembly illustrated in FIG. 10 a skin perforating member 28b is employed which includes a disc 32b having a conically widening or bevelled periphery. The assembly is formed by inserting the perforating member in a recess 46 in a plastic disc 30b, and then softening the adjoining portions of the plastic disc to cause them to flow against the conical periphery of the perforating member disc 32b and lie flush with the under surface thereof. The cover and the perforating member are thus united by a melted plastic interlocking junction.

In the skin perforating assembly embodiment of FIG. 11, a skin perforating member 28c is provided with integral tabs or flanges 48 in spaced relation around the periphery thereof. A cover disc 30c of suitable material is secured on the perforating member by bending the tabs 48 thereover. The cover 30c may be provided with a conically widening or bevelled edge, as illustrated, to facilitate the attachment.

Referring to FIGS. 1–3, the injection device is assembled ready for use simply by placing the inner end 18 of the holder 12 on the outer surface of the cover 30 of the skin perforating assembly 14, in register or mating with the cover. The perforating assembly is retained in the same position by the magnet 24 acting on the magnetizable perforating member disc 32. Similarly, an injection device is assembled employing any of the holders illustrated in FIGS. 4–6 in place of the holder 12, and employing any of the skin perforating assemblies illustrated in FIGS. 8–11 in place of the perforating assembly 14.

The injection device is employed for skin testing, vaccination, or innoculation in like manner to my aforesaid prior devices. Thus, an antigen, allergen, or chemotherapeutic agent may be applied on the skin, and the injection device is then placed against the skin and pressed inwardly to form a plurality of skin punctures with a resulting injection of the substance at the site of each puncture. In a very advantageous application, such biological substances may be provided in dried or semi-dried form on the needle-like projections 34. It is then merely necessary to press the injection device against the skin. In this manner, a great variety of transcutaneous injections may be made with biologically active substances, including various antigens, allergens, and chemotherapeutic agents. Vaccines which may be injected with the device include, for example, the vaccines for whooping cough, polio, rabies, yellow fever, smallpox, "B.C.G." for tuberculosis, and others. Exemplary testing materials include coccidioidin, blastomycin, histoplasmin, lepromin, and tuberculin, as well as allergens for foods and pollens.

The injection device is especially adapted for application to the skin in the manner illustrated in FIG. 1, although it may be employed in other suitable ways. The holder 12 is grasped between the thumb and second finger of one hand, at any location around the periphery thereof, and the tip of the index finger is placed on the concave end 20. The injection device is placed on the area to be vaccinated, with the projections 34 on the skin. The needles are pressed into the skin and held for a few moments until the body fluids dissolve the active substance from the points. Preferably, the holder may be turned slightly while the needles are embedded in the skin, to insure that the active substance is removed from the needles and deposited in or beneath the skin. This completes the injection, and the device is removed from the skin. The skin perforating assembly 14 is removed from the holder 12, and the former is discarded.

In making a series of injections, the holder 12 is attached to a new perforating assembly 14 for each injection. The injections are greatly facilitated by a skin perforating member package 50 illustrated in FIGS. 12 and 13. The package is adapted for cooperation with an injection device holder such as any of the holders in FIGS. 1, 2 and 4–6. The package includes a substantially rigid container body 52 having a series of individual cylindrical receptacle portions or troughs 53 therein defining cavities 54. Enlarged upper wall portions 56 are provided on the receptacle portions, forming annular ledges or shoulders 58 within the receptacle portions. One perforating assembly 14 is mounted within each receptacle 53, and is seated on the ledge 58 therein. A flexible closure 60 is provided on the container body 52, and it seals the cavities 54 individually.

The container body 52 is constructed of molded sheet material, which in the preferred embodiment illustrated is a molded strip of plastic, such as polyethylene. The closure 60 preferably is a peelable strip of like plastic sheet material which is joined to upper web portions 62 of the container body by suitable means, such as by heat sealing or solvent welding. The side 36 of the perforating member disc 32 from which the projections 34 extend is seated on the ledge 58 in each cavity, with the projections supported away from the sides and bottom of the receptacle 53. The opposite side 40 of the perforating member disc constitutes the outermost surface of the member. With the cover 30 attached to this side, the cover provides the outermost surface on the perforating assembly 14. The height of the upper wall portion 56 of each receptacle 53 is sufficient to space the cover 30 below the closure 60 and provide a recess 64 over each perforating assembly when the closure is removed. This spacing prevents the closure from sticking to the perforating assembly 14, and the recess accommodates the flat circular end 18 of the holder 12.

The projections 34 of the packaged perforating assemblies preferably are provided with biologically active substances thereon, as described above, or if desired, such substances may be omitted. The construction of the container body 52 and the manner in which the perforating assemblies are mounted in the receptacles 53 prevents the active substances from being rubbed off the projections. Each package 50 may be provided with a series of perforating assemblies 14 having the same active substances on the projections thereof, for making the same injection on a number of persons. In another very useful application, perforating assemblies 14 each having a different biologically active substance on the projections 34 thereof, may be arranged in the package in a predetermined sequence. In this manner, the physician may be provided with perforating members bearing different allergens, for example, so that a predetermined pattern of injections may be made on the skin of one individual as is commonly done in testing for allergic reactions.

In a further advantageous embodiment, the package 50 may include a quantity of an adherent fluent biologically active composition 66 in one or more of the cavities 54, as illustrated in FIG. 13 in the receptacle 53a. This type of package is especially useful for supplying active substances which may deteriorate or lose their potency on drying. It also assists in retaining a coating of the active substance on the surfaces of the projections 34 up to the time of use. The active substance may be provided in a liquid or semiliquid composition, such as in glycerine, agar or pectin. The cavity 54 preferably is filled substantially to the ledge 58 so as to immerse the projections 34 in the composition. The composition adheres to the projections when the perforating assembly 14 is removed from the package, and an injection may be made immediately.

The peelable closure 60 may be removed to expose the cavities 54 successively for removal of perforating assemblies 14 therefrom. As each cavity is exposed, the inner flat end 18 of the magnetic holder 12 is inserted in the recess 64 above the perforating assembly, thereby registering the holder end with the cover 30 of the assembly. In this manner, the assembly is engaged with the holder and magnetically attached thereto, and the assembly is removed from the cavity with the holder. The injection device 10 is then assembled as illustrated in FIGS. 1 and 2, and it is ready for use. It will be observed that no manual manipulation of the assembly 14 is required for preparing the injection device. After performing an injection therewith, the perforating assembly 14 is separated from the holder 12 and discarded. Thereafter, the closure 60 for the package is peeled back to expose additional cavities and perforating assemblies therein successively for successive injections.

While the package 50 illustrated represents a preferred form of the invention, it may be constructed in other ways which maintain the sterility of the perforating assemblies 14 and which cooperate with the holder in removing them from the package. The container body 52 and the closure 60 may be constructed of other materials. For example, the container body 52 may be formed of a thin metal sheet material, and the closure 60 may be metal foil.

FIGS. 14–27 illustrate additional embodiments of the new injection device, wherein other means are provided for detachably securing a skin perforating member on a holder, solely by manipulation of the holder. FIGS. 14 and 15 illustrate a suction holder 12d which includes a suction cup 68. The cup engages and holds the upper smooth flat surface of the perforating assembly cover 30a. The holder may be constructed of rubber and include an integral cup, as shown, or the holder may be constructed of other material such as plastic, wood, or metal and the cup joined thereto. In a further alternative, a suction cup may be mounted on the assembly cover 30a to engage a smooth base on the holder.

FIGS. 16–18 illustrate the provision of frictionally interengageable parts on a holder 12e and a perforating assembly which includes a perforating member 28e and a cover 30e. The holder in this embodiment is plastic but may be constructed of other material, and it has a cylindrical recess 70 in its base. The perforating assembly is similar to that of FIG. 8, with the addition of a substantially cylindrical raised portion 72 formed in the cover 30e. Ribs 74 protrude from the side of the raised portion. The holder is pressed against the cover, and the raised portion 72 is received in the recess 70 in frictional engagement with the holder. It will be apparent that the parts may be constructed in other ways for frictionally engaging them.

FIGS. 19–23 show spring clip means for engaging a holder 12f and a perforating assembly. The assembly in FIGS. 19–21 may be constructed of a perforating member 28 as seen in FIG. 7, and a cover 30f welded or soldered thereto. The holder is constructed of any of the materials previously described. It includes a peripheral bead 76 at its base, and the cover includes integral spring clips 78 which snap over the bead when the holder is pressed against the cover. Alternatively, the perforating member 28 and the cover 30f having the clips 78 may be constructed in one piece in the manner of the assembly shown in FIG. 8. If desired, the clips may be formed on the perforating member. A construction similar to the latter is illustrated in FIGS. 22 and 23, with the difference that a separate cover 30 is attached to a perforating member 28g by a fluid film 42 as illustrated in FIG. 3. Clips 78g integral with the perforating member extend beyond the cover to engage the bead 76 on the holder 12f. Similarly, spring clips may be provided on the holder for engagement with the perforating assembly, if desired, or other resilient interengaging members may be substituted.

FIGS. 24–27 illustrate interengageable bayonet fastening means on the holder and the perforating assembly. A holder 12h includes a bayonet lug or connector having a shank or pin 80 and an enlarged oblong head 82. The shank may be integral with the holder, or the lug may constitute a separate part. The perforating assembly includes a fastener 84 having a bayonet slot 86 in a raised central portion 88 thereof. The fastener is joined by welding or soldering to the cover 30 and the perforating member 28 illustrated in FIG. 7, the parts being constructed of metal in this case. The injection device is assembled by moving the shank 80 of the lug into the slot 86, and the enlarged head 82 is received beneath the raised portion 88 of the fastener to secure the holder and perforating assembly together. The positions of the lug and the fastener may be interchanged, or if desired, other bayonet type fastening means may be substituted.

The several perforating assemblies shown in FIGS. 14–27 are packaged in the manner illustrated for the assembly 14 in FIGS. 12 and 13. In each case, the appropriate holder is supplied with the package. In use, the holder is simply placed on the perforating assembly and attached thereto while in the package, and the resulting injection device is withdrawn ready for use. The perforating assembly is readily removed from the holder and discarded following each injection.

The new injection device is simply, economically and reliably constructed and used. The skin perforating members may be fabricated in quantity by precise methods and assembled with one of the covers. The holders are readily and economically produced in quantity. Simple and economical fastening means are provided. The package 50 constitutes an effective means of maintaining the sterility of the perforating members while cooperating with the holders in assembling the injection device with no necessity for manipulating the perforating member, and yet the package is very economical. The injection device is well suited for rapid, accurate and highly effective use in performing a series of injections.

It will be apparent that various additional changes and modifications may be made in the construction and arrangement of the components of the injection device and the package within the spirit and scope of the invention, and it is intended that such changes and modifications be included within the scope of the appended claims.

I claim:

1. An injection device comprising, in combination, a holder, a readily disposable skin perforating member including a thin substantially flat disc and a plurality of needle-like projections punched from said disc to leave an opening therethrough, said projections extending in spaced apart relation from one side of said disc and being adapted simultaneously to puncture and penetrate the skin up to the disc at a plurality of points and to inject a substance into the body, said perforating member being disposed with the side of said disc opposite to said one side facing said holder, a cover for said perforating member interposed between said holder and said disc opposite side to close said opening, and means for detachably securing said perforating member on said holder with said cover therebetween, whereby an injection may be made by grasping said holder and pressing said projections against the skin, and thereafter said perforating member and cover may be removed from said holder and replaced by another like perforating member and cover.

2. An injection device as defined in claim 1 wherein said cover comprises a metal disc.

3. An injection device as defined in claim 1 wherein said cover comprises a plastic disc.

4. An injection device comprising, in combination, a holder including a magnet, a readily disposable skin perforating member including a thin substantially flat magnetizable metal disc and a plurality of needle-like projections punched from said disc to leave an opening therethrough, said projections extending in spaced apart relation from one side of said disc and being adapted simultaneously to puncture and penetrate the skin up to the disc at a plurality of points and to inject a substance into the body, and a cover for said perforating member, said holder being adapted for magnetically holding said perforating member with the side of said disc opposite to said one side facing the holder, said cover being interposed between said disc opposite side and said holder to close said opening, whereby an injection may be made by grasping said holder and pressing said projections against the skin, and thereafter said perforating member and cover may be removed from said holder and replaced by another like perforating member and cover.

5. An injection device as defined in claim 4 wherein said cover comprises a metal disc attached to said perforating member disc.

6. An injection device as defined in claim 4 wherein said cover comprises a plastic disc attached to said perforating member disc.

7. An injection device comprising, in combination, a holder, a readily disposable skin perforating member including a thin substantially flat disc having a plurality of needle-like projections extending in spaced apart relation from one side of said disc, said needle-like projections being adapted simultaneously to puncture and penetrate the skin to a depth substantially equal to their length and to inject a substance into the body, said perforating member being disposed with the side of said disc opposite said first mentioned side facing said holder, a cover for said perforating member interposed between said holder and said disc so as physically to isolate said holder from said perforating member and to tend to prevent contamination of said holder by substances on said perforating member and by body fluids released by the penetration of said needle-like projections into the skin, and means for detachably securing said perforating member on said holder with said cover therebetween, whereby an injection may be made by grasping said holder and pressing said projections against the skin, and thereafter said perforating member and cover may be removed from said holder and be replaced by another like perforating member and cover preparatory to making another injection.

References Cited by the Examiner
UNITED STATES PATENTS

| | | | |
|---|---|---|---|
| D. 188,231 | 6/1960 | East. | |
| 585,007 | 6/1897 | Rambaud | 206—63.4 |
| 616,042 | 12/1898 | Walsh | 206—63.4 |
| 2,131,284 | 9/1938 | Kituriz | 128—333 |
| 2,736,656 | 2/1956 | Marshall | 206—56 |
| 2,818,070 | 12/1957 | Barry. | |
| 2,876,774 | 3/1959 | Kravitz | 128—253 |
| 2,893,392 | 7/1959 | Wagner | 128—253 |
| 2,974,787 | 3/1961 | Cooper. | |
| 3,072,122 | 1/1963 | Rosenthal | 128—253 |

FOREIGN PATENTS

| | | |
|---|---|---|
| 653,118 | 5/1951 | Great Britain. |

RICHARD A. GAUDET, *Primary Examiner.*

RICHARD J. HOFFMAN, *Examiner.*